United States Patent [19]
Denniston

[11] Patent Number: 5,514,035
[45] Date of Patent: May 7, 1996

[54] DESICCANT BASED CABIN WINDSHIELD DEFOG/DEFROST SYSTEM

[76] Inventor: James G. T. Denniston, 231 Green Harbor Rd., Unit #15, Old Hickory, Tenn. 37138

[21] Appl. No.: 271,517

[22] Filed: Jul. 7, 1994

[51] Int. Cl.$^6$ ........................................... B60S 1/54
[52] U.S. Cl. ........................ 454/121; 55/385.3; 96/144; 96/150
[58] Field of Search ................... 55/385.3; 96/118, 96/144, 150; 62/271; 454/121

[56] References Cited

U.S. PATENT DOCUMENTS

| | | | |
|---|---|---|---|
| 2,295,750 | 9/1942 | Norris et al. | 55/385.3 X |
| 2,328,974 | 9/1943 | Guler | 96/144 X |
| 3,889,742 | 6/1975 | Rush et al. | 96/144 |
| 4,071,336 | 1/1978 | Yamine | 55/203 |
| 4,594,860 | 6/1986 | Coellner et al. | 96/118 |
| 4,719,761 | 1/1988 | Cromer | 62/271 X |
| 5,261,254 | 11/1993 | Cattane | 62/271 |

*Primary Examiner*—William E. Tapolcai
*Attorney, Agent, or Firm*—Rick R. Wascher

[57] ABSTRACT

The present invention describes a method and apparatus for preventing and/or removing the condensation from the inside of the windshield, side windows, and rear windows of an automobile, truck, boat, aircraft, tractor, train, military vehicle, or similar vehicle cabin to provide clear visibility for the occupants. In addition to condensation removal, the system provides added benefits of enhanced cooling effects and comfort for the occupants by lowering the cabin humidity, and the operation and efficiency of the air-conditioning system is also improved due to the reduction in the humidity. A desiccant wheel system is used to perform the dehumidification. Automatic and manual controls prevent condensation from forming and may also be set to maintain a lower humidity level for the occupant comfort and cooling efficiency. The desiccant wheel is regenerated by hot air from a heat exchanger or other heat source using excess engine heat. An air filter is provided at the air intake for both the cabin air and hot air to prevent foreign matter from entering the system. The dehumidification is performed without introducing outside air into the cabin.

4 Claims, 8 Drawing Sheets

DESICCANT BASED CABIN WINDSHIELD DEFOG/DEFROST SYSTEM

BACKGROUND OF THE INVENTION

1. Field of the Invention

The present invention relates generally to methods and apparatuses for preventing or removing condensation from the inside of cabin windows of motor powered vehicles (hereinafter "motorized vehicles").

2. Description of the Related Art

Motorized vehicles are known to develop window/windshield condensation. The closed area of the cabin, along with the occupants breathing out moist air, tends to rapidly produce condensation on the inside of the glass of the windows. Condensation has been known to accumulate during the operation of a vehicle when the inside air temperature and humidity of the cabin combines with the cold window.

Motorized vehicle operation safety is believed to be significantly enhanced due to the prevention or elimination of visual impairment or obstruction from moisture, fog, of frost on the inside of cabin windows of motorized vehicles (e.g. cars, trucks, boats, helicopters, tractors, trains, military equipment, airplanes, etc.). Traditional cabin defrost/defog systems provide the operator with the option to switch to outside air and/or increase the inside cabin temperature to remove the condensation. This method of defrost/defog attempts to eliminate the condensation by introducing outside air with a lower level of humidity and/or change the inside air temperature, or the temperature of the window glass, to avoid having the inside air reach the due point.

One of the disadvantages of conventional systems is the occupants must take action to eliminate the condensation even though the comfort of the occupants may be sacrificed to eliminate the condensation. In these situations, safe operation of the vehicle could be jeopardized because the corrective action to eliminate the condensation does not usually begin until the occupant can see the condensation, which is often after the operator's vision is impaired.

The operator must then adjust the controls an attempt to correct the cabin climate controls an attempt to eliminate the condensation. If the operator makes the adjustment incorrectly the window may actually accumulate more condensation and create a more serious unsafe condition, such as when the operators vision through the windshield or other windows is completely blocked by condensation.

There are times when the introduction of outside air is undesirable to the occupants of the cabin, such as when the vehicle is passing through smog, exhaust filled environments, or in the presents of other gases or fumes. Although many of the cabin environmental systems in today's vehicles have been improved to include automatic temperature and fan controls, the humidity level in the vehicle generally remains un-monitored, unregulated and uncontrolled.

SUMMARY OF THE PRESENT INVENTION

This invention, through the use of a desiccant dehumidification system, lowers the humidity of the inside cabin air; thereby, preventing or eliminating condensation, improving the comfort for the occupants, and increasing the efficiency of the air-conditioning system.

The present invention provides an automatic cabin humidity control system. The invention may also include optional sensors to detect the existing temperature and humidity. For example, when the temperature and humidity approach a level where condensation may form on the windows an automatic controller activates the desiccant dehumidification system. The automatic control unit sends electrical current to the cabin chamber fan, the rotary motor, the hot chamber fan, and the engine coolant valve to move it to the open position.

The apparatus directs a stream of dehumidified air "dry air" toward the windows to evaporate existing condensation that may exist, or prevents the formation of new condensation. The apparatus is designed to reduce the humidity of the cabin air near the windows and continue to remove humidity (moisture) until the humidity level reaches a desired level within the cabin. Since the regeneration of the desiccant wheel is preferably accomplished by using the excess heat from the engine, the only additional energy necessary to operate the apparatus is in the form of electrical energy to operate the controls, motors, and valves. When the apparatus is used in conjunction with an existing cabin air-conditioning system found in most vehicles the combined energy requirement to operate such a system may be reduced.

Additional energy savings may also be realized when one considers that the occupant(s) of the motorized vehicle in which the invention is installed will experience a faster rate of body cooling resulting from the effects of the dry air evaporating body perspiration during the operation of the system. The acceleration of the body's natural cooling is believed to cause the occupants to use the air-conditioning system less often, since the dehumidification system may operate independently form the air-conditioning A further benefit will be obtained by the occupants since their clothing will remain fresh and free from the effect of moisture that could wilt the crisp effect of starch or ironing on their clothing. The present invention will lessen the possibility that the air-conditioning system's cooling coils could build up frost. Although the desiccant system may use some of the existing duct and vent design to deliver dehumidified air, the inventive apparatus and system are designed to function independently, such as when the need to cool or heat the cabin will not always coincide with the need to reduce humidity.

The inventive apparatus and system can be summarized in a variety of ways, one of which is the following: an apparatus and system for defrosting or defogging the interior portion of a windshield with an impinging air stream, wherein the windshield surface to be defrosted or defogged is contained within the cabin compartment of a motorized vehicle, wherein the apparatus comprises: a rotary desiccant wheel, a driver to rotate the wheel, a heat exchanger (or other heat source), a case having an interior to house the desiccant wheel, a first fan for drawing air from the cabin compartment of the motorized vehicle and forcing the air through the desiccant wheel to the upper section of the cabin side chamber of the case and back to the cabin of the motorized vehicle, and a second fan for pulling an air stream through a heat exchanger into the lower chamber of the hot section of the case and then through the desiccant wheel to the upper chamber of the hot section of the case where the second fan ejects the hot moist air to atmosphere.

The desiccant wheel rotates within the cabin and hot chambers of the case to enable the desiccant material applied to the desiccant wheel to first collect moisture in the cabin chamber and then releases the moisture in the hot chamber. This is accomplished by the delivery of the moist cabin air to half of the desiccant wheel by the first film where the moisture is adsorbed by the desiccant. As the dry air exits the wheel it is directed back into the cabin. The desiccant wheel slowly rotates into the hot chamber where the second fan pulls in air from atmosphere across the heating elements of the heat exchanger then the hot air enters the hot half of the desiccant wheel to evaporate off the moisture that was previously adsorbed by the desiccant in the cabin side of the apparatus. The hot chamber recharges (evaporates the moisture) the desiccant wheel to prepare it for it's next cycle through the cabin side of the apparatus. The now dry desiccant material on this portion of the wheel rotates back into the cabin chamber to continue the repetitive cycle.

The invention may also include a cabin air baffle (valve) to direct the dehumidified cabin air from the invention into the air-conditioning system return air to reduce/eliminate the build up of frost on the cooling coils in the air-conditioner. The baffle would only be activated to direct air to the air-conditioner after the system sensors and control system determined that the need to lower the humidity for windshield defog/defrosting had been accomplished, the air-conditioner was on, and the humidity level was high enough to warrant the need for dehumidification.

The preferred fan arrangement is configured to provide positive pressure on the cabin side and negative pressure on the hot side of the case. The fan configuration will force any air leakage from the cabin side to the hot side and the design further incorporates seals to prevent air flow from the hot side to the cabin.

The optional sensors are included in the invention to provide information to the electronic humidity control device. The sensors transmit data used by the control device for determining when the windshield is approaching the dew point. This is accomplished by the sensors providing both cabin air and windshield temperature, and relative humidity information to the control device. The electronic control device uses the sensor data to determine when to turn on/off the apparatus and also displays temperature and relative humidity information so the occupant(s) may adjust the desired humidity to a lower level for comfort after the system has eliminated the possibility of fog/frost on the windshield.

An alternate electronic humidity control device (hereafter "alternate control) may be used to perform the above functions and in addition control the air baffle (valve) to the air-conditioner. The alternative control would perform this additional function by send electrical current to regulate the air baffle, this would control the flow of dehumidified air into the air-conditioner intake, and the alternative control would continue to operate the apparatus and supply dehumidified air after the system has lowered the humidity level to a point where the possibility of condensation on the windshield is eliminated. The alternative control would continue to operate the apparatus as long as the air-conditioner system is operating and the relative humidity level is higher than desired.

The invention also includes a method of removing condensation from the interior cabin compartment of a motorized vehicle, which can be summarized as including the following steps: monitoring the humidity level of the cabin of a motorized vehicle, regulating the humidity level of the cabin by electronically controlling the apparatus to automatically turn the system on when condensation could form on the windshield of the cabin, dehumidifying the air extracted from the cabin by passing the air through rotating desiccant material during a dehumidification cycle, recharging the desiccant with hot air then expelling the moist hot air from the apparatus outside the system, introducing a dehumidified air stream into the cabin compartment of a motor vehicle to lower the relative humidity in the cabin to prevent/remove fog/frost on the windows.

The apparatus can be summarized as consisting of: a humidity control device to receive data from the temperature and humidity sensors and determines if the relative humidity is approaching the dew point on the inside of the windshield, the electronic humidity control device controls the activation of the fans, motors and valves to start or stop the dehumidification process, a fan first passes cabin air through a rotating desiccant wheel driven by a torque motor to remove the moisture from the cabin air then forces the dehumidified air back into the cabin, another fan pulls air from atmosphere to be heated by the heat exchanger then the hot air is used to recharge the desiccant material on the wheel as the wheel rotates into the hot chamber, the hot moist air is then expelled back into the atmosphere by the fan and the desiccant wheel continues it's rotation back into the cabin side chamber of the case to perform another cycle of dehumidification, the control device provides the occupants with an adjustment option to set the desired relative humidity for the unit so it will continue to lower the relative humidity below the point where the automatic control would turn the system off.

DESCRIPTION OF A PREFERRED EMBODIMENT

Figure 1:
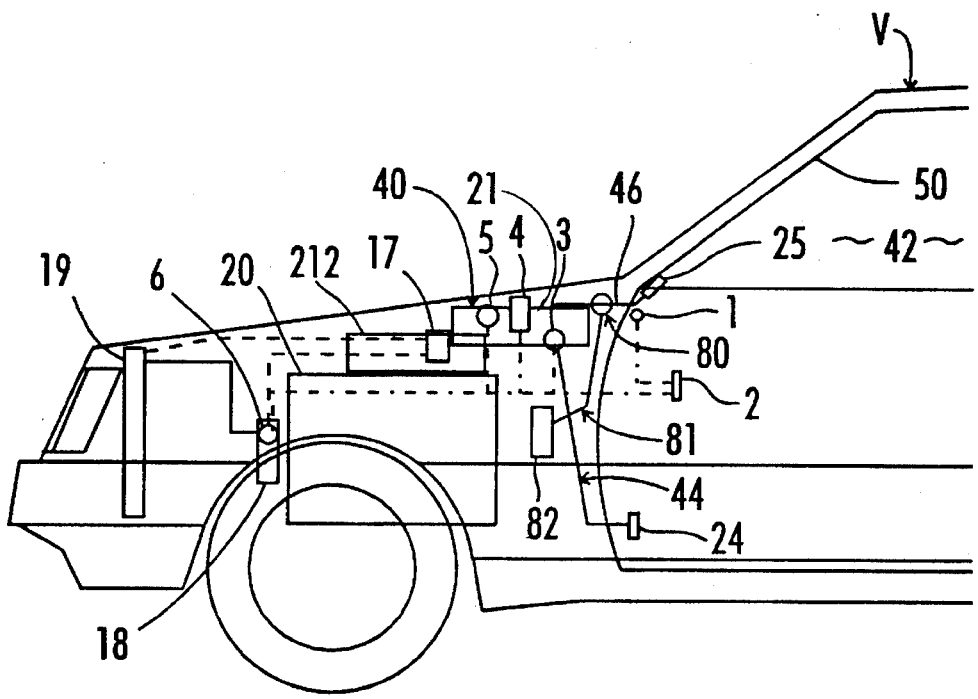
FIG. 1 is a schematic side view of an embodiment of the apparatus of the present invention in an automobile application.

FIG. 1 shows the relative position of the inventive apparatus in a motorized vehicle designated generally by the reference letter "V", but more particularly in an automobile application where the engine is designated as 20, engine carburetor and air filter as 212, the radiator as 19, and engine water (coolant) pump 18 which provides the heat system to the apparatus' heat exchanger 17.

The apparatus is supplied with hot water when the engine water (coolant) valve 6 opens and the hot water flows through hoses to the heat exchanger 17. The system incorporates a desiccant wheel designated generally by the numeral 21 (also shown as 11 & 12).

An alternate source of heat can be obtained by using the heat from the engine exhaust manifold and/or exhaust pipe (not shown). This alternative source provides quicker heat to the system, however special caution is required to prevent carbon monoxide from entering the cabin.

Figure 11:
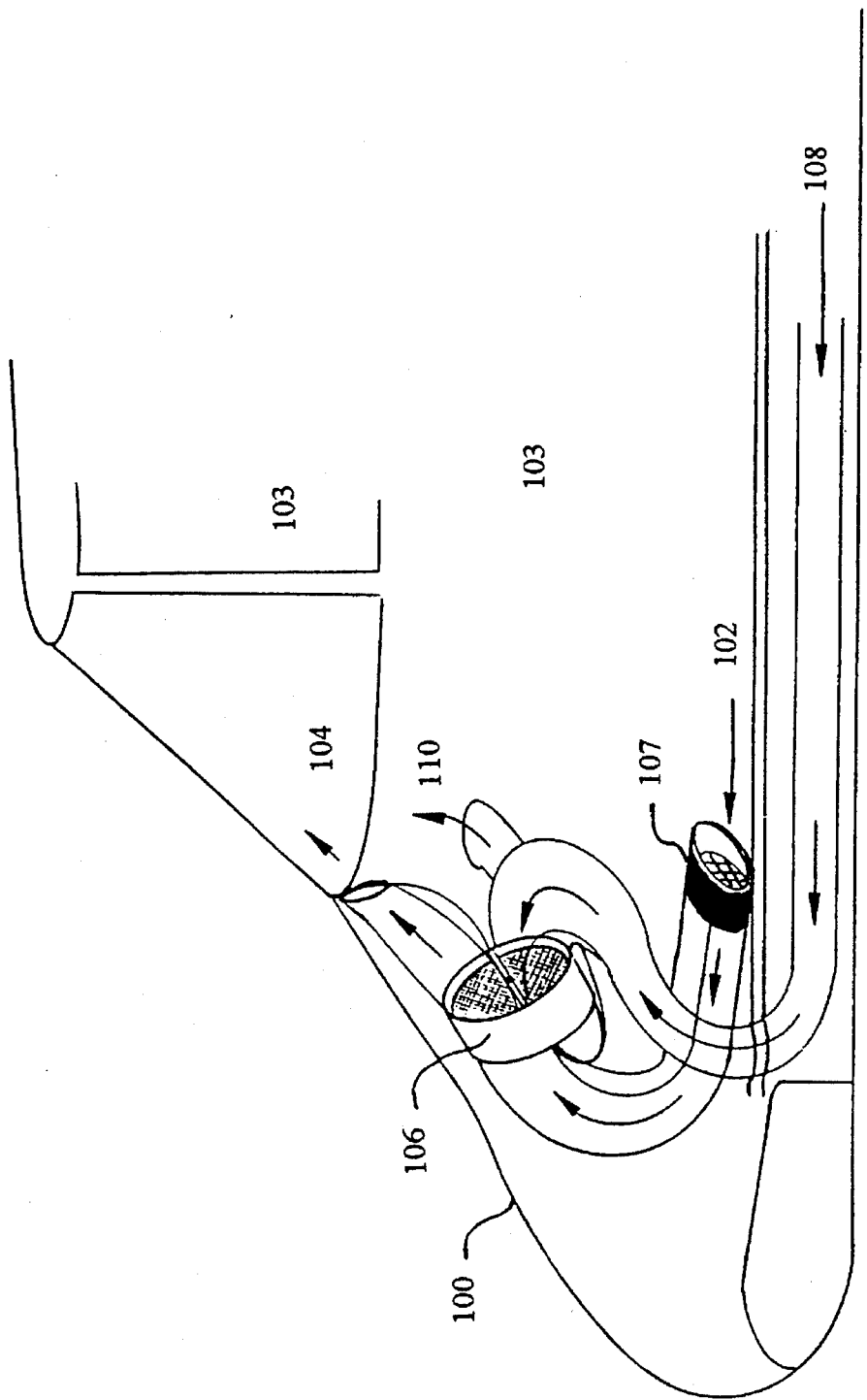
FIG. 11 is a schematic view of the air flow pattern of the invention shown in use in a helicopter embodiment of the system.
Figure 12:
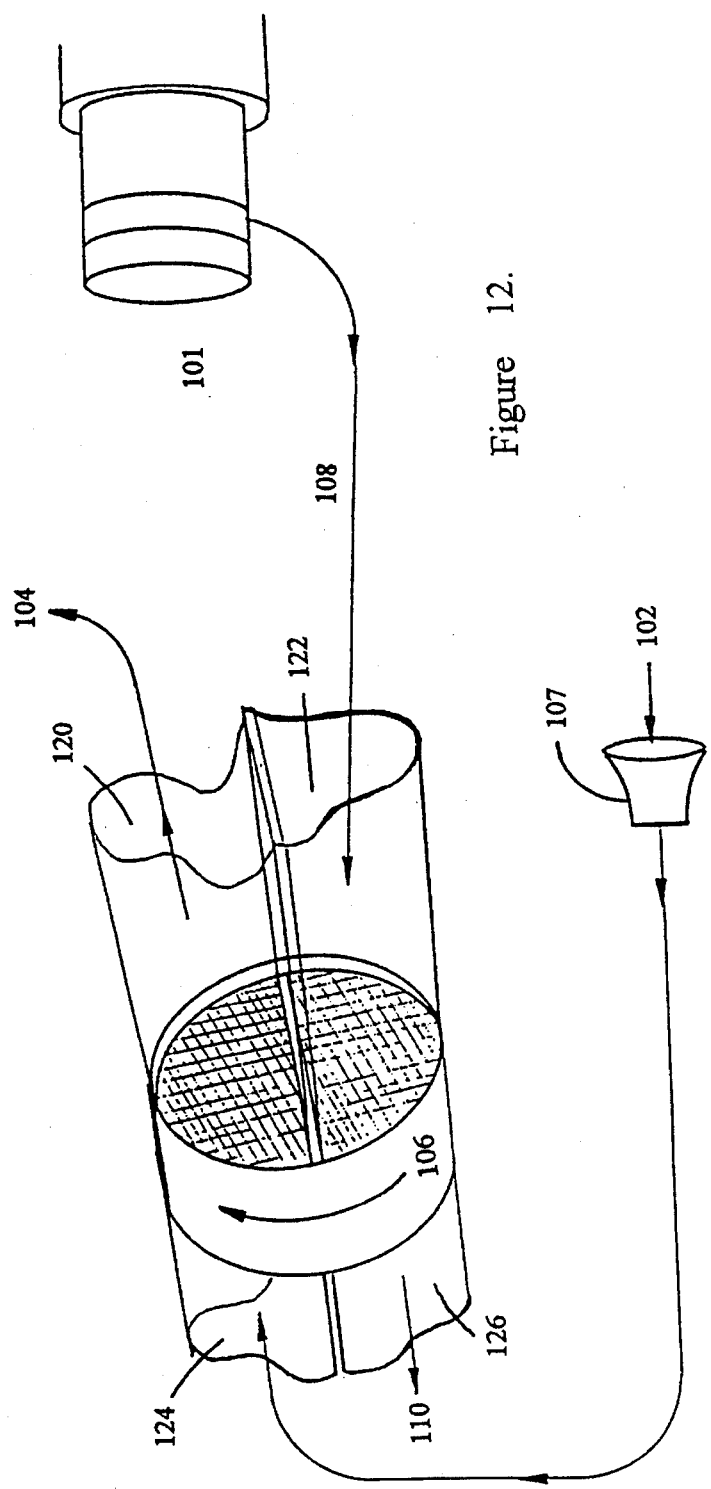
FIG. 12 and 13 are detailed schematic views of the invention shown in FIG. 11.
Figure 13:
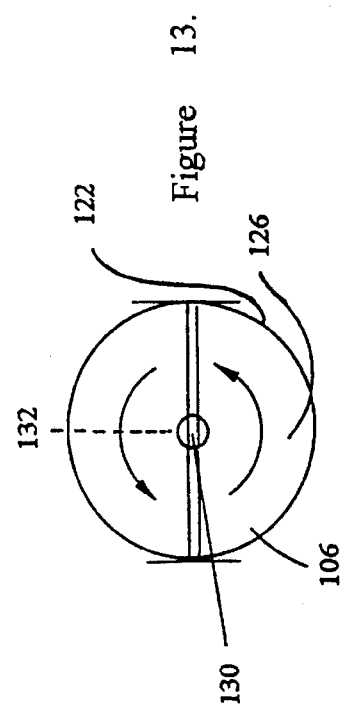

Another alternate source of heat can be obtained by using bleed air from the compressor section of a turbine engine powered vehicle shown in FIGS. 11, 12, 13.

A hot chamber fan 5 pulls outside air through the hot section of the apparatus to regenerate the desiccant wheel 21. The outside air at atmospheric temperature is heated as it passes through the heat exchanger 17. As the hot air from the heat exchanger is delivered to the desiccant wheel 21 contained in the case 40, and passes through the desiccant wheel 21, moisture is adsorbed by the desiccant material (not readily seen in the drawings) applied to the wheel.

The system and apparatus are designed such that adsorbed moisture in the desiccant of the desiccant wheel 21 evaporates into the hot air and is expelled into the atmosphere. That is, after the air passes through the desiccant wheel 21, it passes through the fan 5 and is expelled outside. Humid air in the cabin 42 is pulled out of the vent 24 and the cabin side fan 3. The operation of the cabin side fan 3 functions in the system by pushing this cabin air to the desiccant wheel 21 where the humidity from the incoming cabin air is adsorbed into the desiccant material of the wheel. After the humidity is removed, the now dry cabin air is pushed further through an air duct 46 connecting the cabin side of the apparatus case 40 and directed through the windshield dash vent 25 back into the cabin 42.

The system may also include an air baffle (valve) 80 to direct the dehumidified cabin air from the invention into the air-conditioning system return air to reduce/eliminate the build up of frost on the cooling coils in the air-conditioner. The baffle 80 includes conduit 81 connected to the air conditioner 82, and preferably would only be activated to direct air to the air-conditioner 82 after the system sensors and control system determined that the need to lower the humidity for windshield defog/defrosting had been accomplished, the air-conditioner was on, and the humidity level was high enough to warrant the need for dehumidification.

Figure 2:
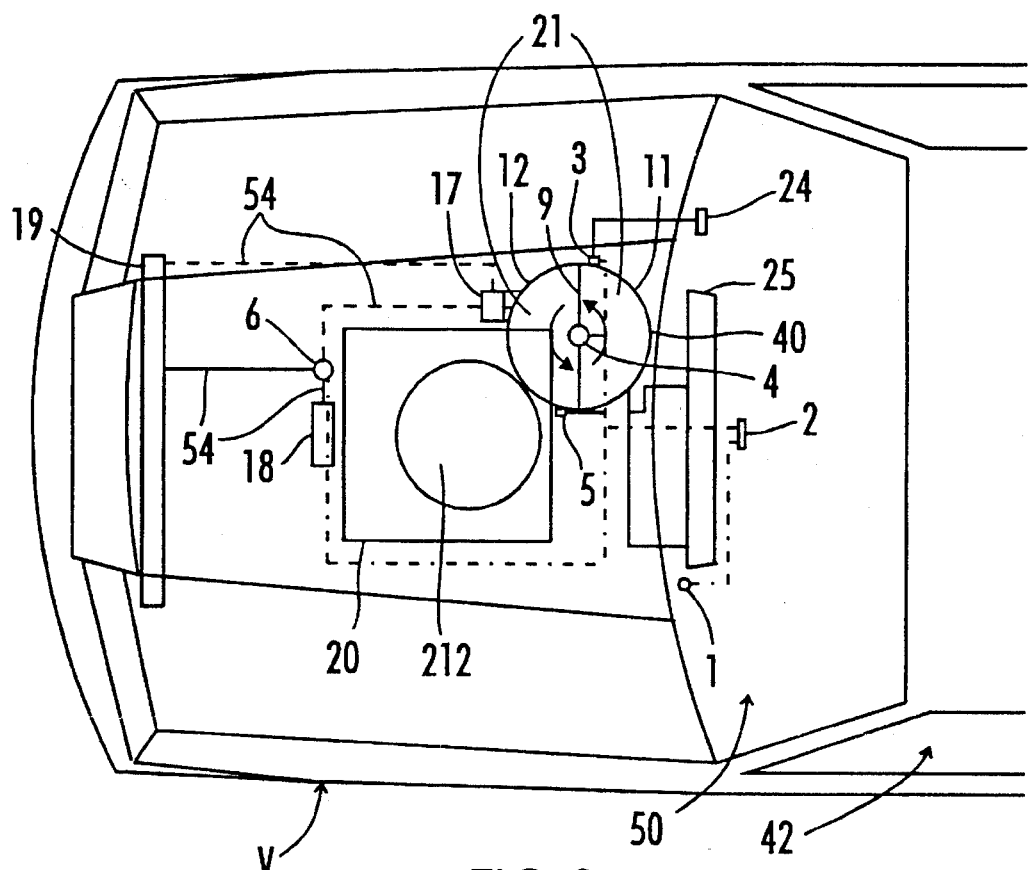
FIG. 2 is a schematic top view showing the rotation of the desiccant wheel of the apparatus of FIG. 1.
Figure 3:
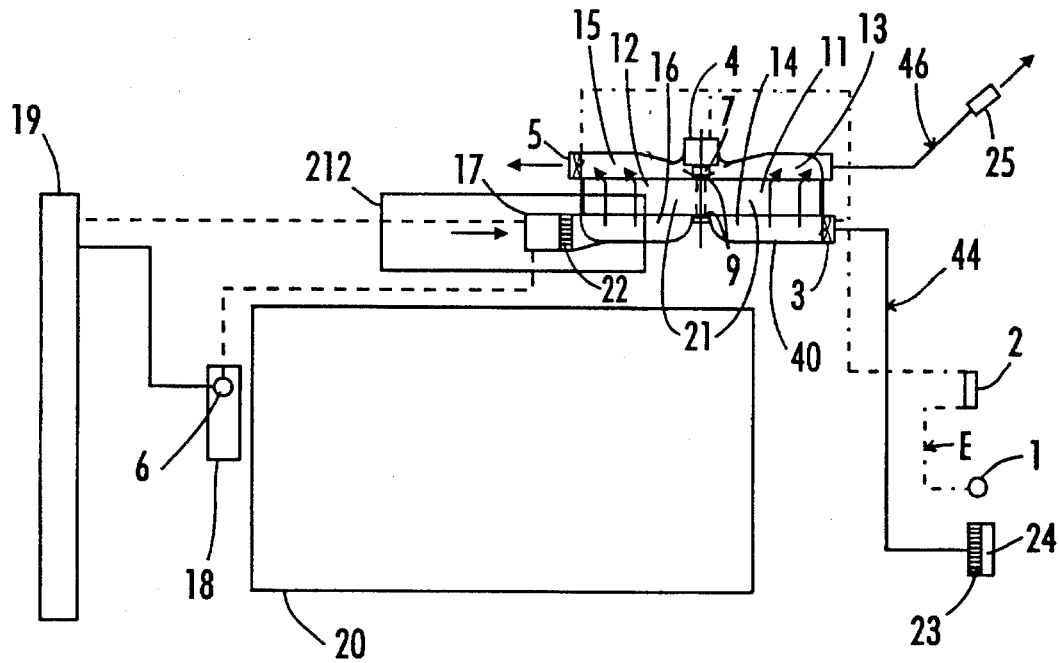
FIG. 3 is a schematic side view, with arrows to show the air flow direction, of the overall system of FIG. 1 including components of a representative motorized vehicle.
Figure 4:
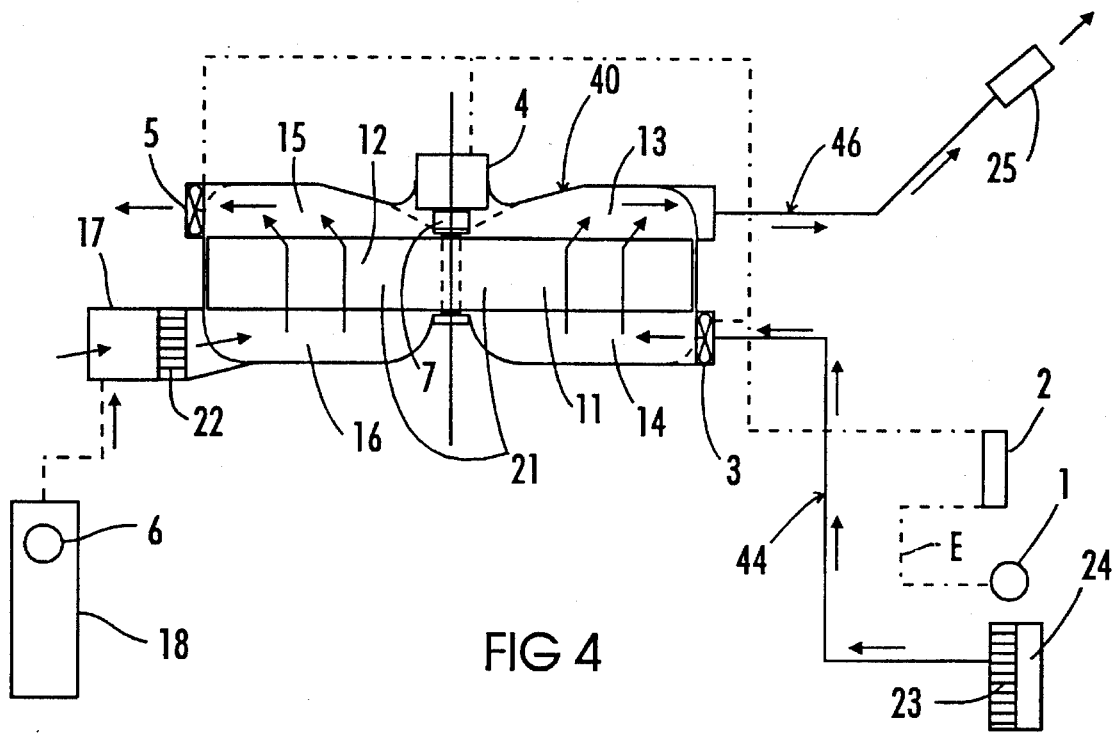
FIG. 4 is an enlarged schematic side view of some of the components shown in FIG. 3, with arrows showing air flow and hot water(coolant) flow direction, and electrical wiring.

With reference to FIGS. 2–4, the location of the apparatus is preferably offset from the center line (not shown) of the motorized vehicle V. The desiccant wheel 21 of the inventive apparatus can be divided with respect to it's position of rotation in to two sections: (i) the cabin side of the desiccant wheel 11 and (ii) the hot section of the desiccant wheel 12. The seal 9 that separates the two sections is on both the top and bottom of the wheel, and attached to the case 40 of the apparatus. The seal 9 prevents the cabin air from mixing between the cabin air chambers 13 and 14, and the hot air chambers 15 and 16.

The torque motor 4 rotates the wheel 21 (cabin section 11 to hot section 12) slowly within the case 40. The rotation of the wheel 21 moves the desiccant applied to the wheel 21 from the cabin chamber 11, where moisture is accumulated (adsorbed), to the hot chamber 12, where the moisture is removed (evaporated) and expelled outside through an exhaust conduit located at the hot chamber fan 5. The moist cabin air passes through vent 24, then through an air conduit 44 from vent 24 to fan 3. Fan 3 forces the moist air into the lower portion of the cabin chamber 14 and through the desiccant wheel 21 (the cabin side 11). The now dehumidified cabin air moves out of the top of the cabin chamber 13 through an air duct 46 to the dashboard vent 25. Vent 25 directs the dehumidified air toward the interior cabin side of the windshield 50 (FIG. 1) to perform the defrost function. Vent 24 and sensor 1 are preferably located under the dash near the occupants feet. The sensor 1 can be of virtually any suitable variety such as a standard ⅛ or ¼ DIN manufactured by Thermologic Corporation of Waltham, Massachusetts. An electrical connection designated generally by the letter "E" is connected to the sensor and used to transmit information electronic humidity control device box 2. The control may also be of any suitable variety such as the PAC series manufactured by Thermologic Corporation. The humidity control box 2 is preferably located on the dash of the motorized vehicle (not shown) next to the convention heat and air-conditioning controls (not shown).

An alternative sensor system may include a second sensor for measuring the windshield glass temperature. Such a temperature sensor may be of any suitable variety such as a compact ⅛ DIN temperature sensor manufactured by Thermologic Corporation. This alternative glass temperature sensor would provide more accurate dew point data for the humidity control device. The humidity control device box 2 has an electrical connection shown in FIG. 4 connecting it to sensor 1, cabin chamber fan 3, hot chamber fan 5, and torque motor 4. The humidity control device box 2 has an electrical connection shown in FIG. 1 connecting it to coolant regulator valve 6.

The apparatus is shown offset to the engine 20 and the engine carburetor (injector) and air filter 212. The engine water (coolant) pump 18 provides the pressure to move the hot water (coolant) through the regulator valve 6 directing the flow to the apparatus' heat exchanger 17 or directly to the radiator 19. The hot water (coolant) exits the apparatus heat exchanger 17 and moves to the radiator 19. In FIG. 2 the hot water passes through standard high temperature rubber radiator hoses 54 to and from the heat exchanger 17.

Figure 8A:
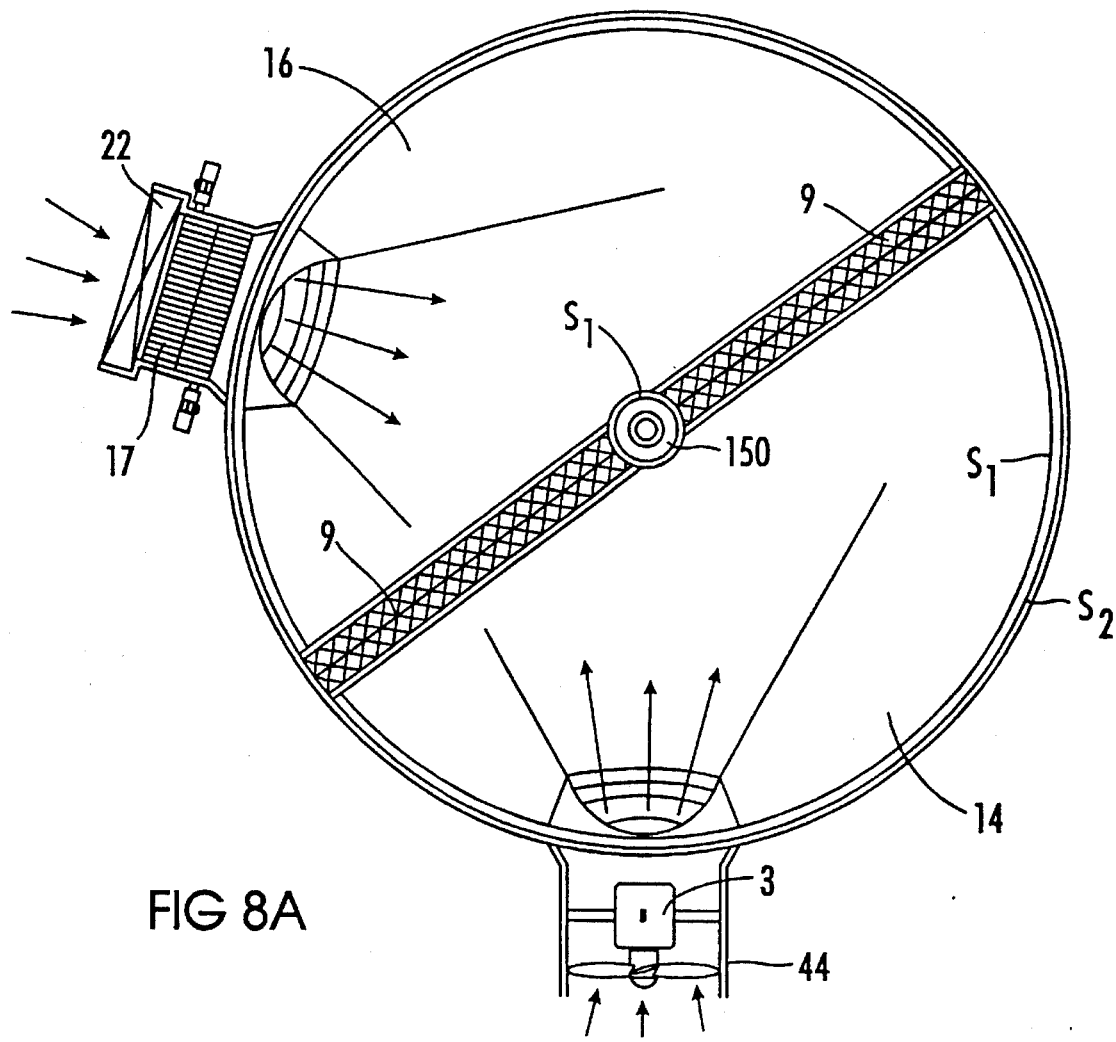
FIG. 8A is a perspective view of the lower case and components of the apparatus of FIG. 7 with the top cover and desiccant wheel removed therefrom.
Figure 9A:
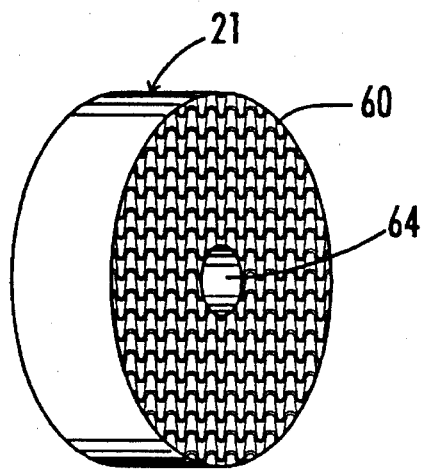
FIG. 9A is a perspective of the embodiment of the desiccant wheel of the present invention.

FIG. 3 shows a side view of the system with the filters 22 & 23. An alternative position for filter 22 is shown in FIG. 8A with the filter 22 located in front of the heat exchanger. The filters prevent dust and dirt from building up on the desiccant wheel 21. The cabin side of the apparatus, therefore, is made up of the dehumidified cabin air chamber 13 which is connected to the defrost vent 25 by air vent duct 46, and the cabin humid air chamber 14 which is connected to the system's cabin air intake vent 24 by air vent duct 44. The cabin side fan 3 forces the air through the half of the desiccant wheel 11 presently located in the cabin side chamber 13 and 14 (FIG. 4). The moisture is removed from the air as it passes through the small geometrically shaped holes 60 in the desiccant wheel 21 (FIGS. 9A, 9B, and 10), as the air moves from the humid chamber of the cabin side of the case 14 to the dry (dehumidified) side of the cabin chamber 13.

Figure 9B:
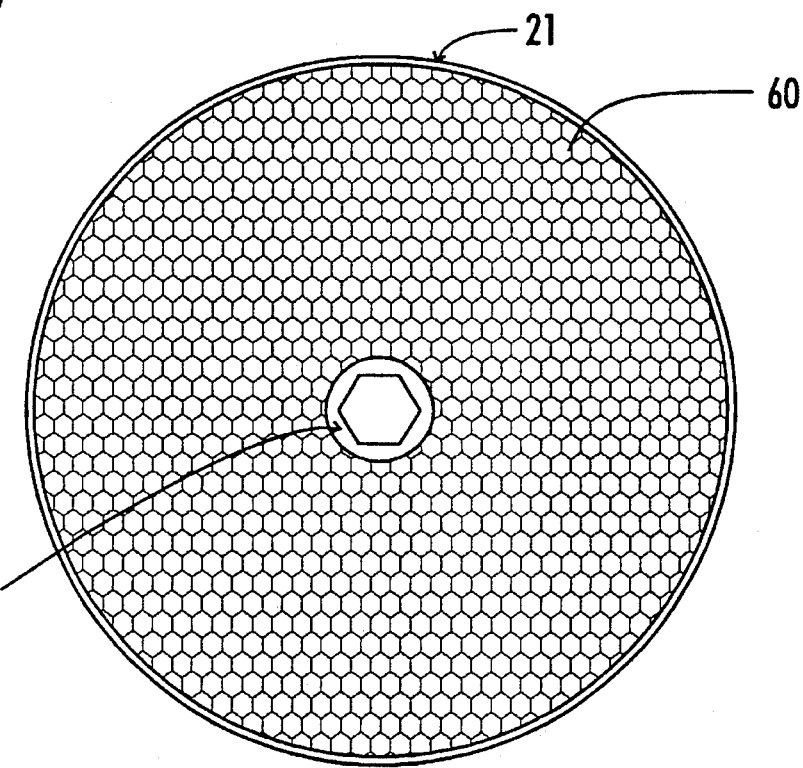
FIG. 9B is a front view of an alternate embodiment of the desiccant wheel shown in FIG. 9A.
Figure 10:
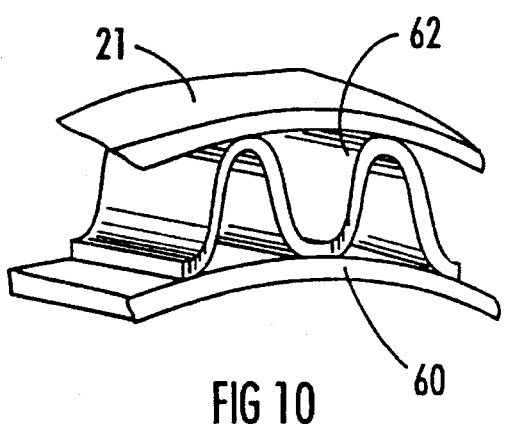
FIG. 10 is a partially fragmented perspective view of a portion of the wheel shown in FIG. 9A.

With reference to FIGS. 9 and 10, the desiccant material is preferably a coating or treatment applied to the surface of the wheel 21. The wheel 21 is comprised of rolled corrugated cardboard, paper, Nomex or similar material with a plurality of pores or holes 60 corresponding to the corrugations 62 of cardboard treated with an adhesive hardening agent to provide strength and rigidity (with the consistency of cured fiberglass) for reliability and continuous operation in the changes of moisture and heat of the apparatus case 40. After the cabin air is dehumidified, it passes through the upper cabin chamber 13 into the air duct 46 and then to the defrost/defog vent 25. The dry air passes over the surface of the windshield glass to remove any condensation and continues to flow until the humidity level in the cabin can not support the formation of condensation on the surface of the interior glass. The occupants may use the alternative humidity control device (not shown) to set the relative humidity lower and in this case the system would continue to operate until the desisted relative humidity is reached, then the automatic function of the control device would turn the system off. The humidity control device 2 continues to monitor and display the humidity level within the cabin after it has deactivated the apparatus, and if it senses the need to perform the dehumidification function it will automatically reactivate the dehumidification system to lower it to the desired level.

The arrows in FIG. 4 show the direction of air flow through the apparatus. Moist air is pulled from the cabin of the vehicle and forced through the wheel 21 in the cabin chamber 13 and 14 of case 40. With regard to the hot side of the apparatus, air is pulled into the system from hot air feed (not shown) or the atmosphere (inside the engine compartment) where it is drawn through the heat exchanger 17, then into the lower hot chamber 16, then through the slowly rotating desiccant wheel during which time the desiccant is recharged, then the hot moist air is pulled into the upper hot chamber 15, then the hot section fan ejects the hot moist air back into the atmosphere.

Figure 8B:
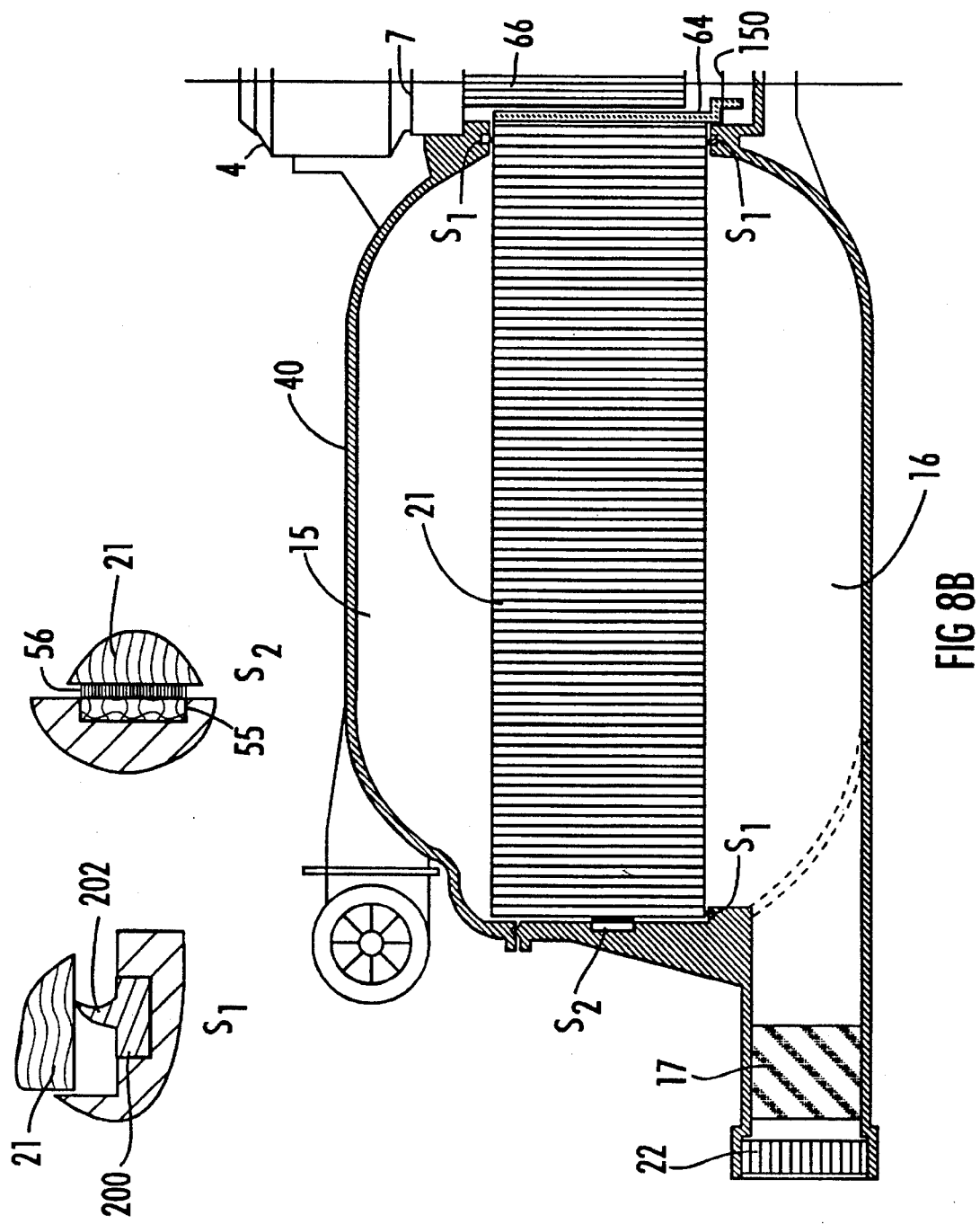
FIG. 8B is a partial cross-section of the hot chamber side of the case portion of the apparatus shown in FIG. 7.

In FIG. 8B and 4 the vertical line representing the center of rotation passing through the torque motor 4, the reduction gear box 7, and the vertical drive shaft 66 which is connected to the reduction gear box 7, and transmits torque to the desiccant wheel 21 through the spline hexagonal shape of both the drive shaft 66 and the center hexagonal spline female receptacle 64 (hereafter female spline). In FIG. 9B the female spline 64 is shown permanently bonded to the center of the desiccant wheel 21. The base of the female spline 64 fits into the lower wheel bearing 150. The weight of the desiccant wheel assembly 21 rest on the lower wheel bearing 150. The lower wheel bearing 150 is fixed to the lower case 40. The design of the torque drive system and case allows easy assembly for both production or repair. The case 40 splits into two sections: (i) the upper section (top cover) with fan 5, torque motor 4, reduction gear box 7, and drive shaft 66 attached (the torque motor 4, reduction gear box 5, and drive shaft 66 are assembled together before they are attached to the top cover of the case 40); (ii) the lower case (base) with cabin fan 3, heat exchanger 17, hot filter 22, and lower wheel bearing 150 attached. To assemble the case, first the desiccant wheel assembly 21 is placed into the lower case, the lower female spline 64 fits into a center bore receptacle in the lower wheel bearing 150 (the center bore receptacle provides alignment for the bottom of the wheel 21 with the lower case), then the upper case is placed over the lower case, drive shaft 66 slides into the female spline 64 of the wheel (drive shaft 64 is long enough to allow the alignment of both sets of splines before the case is lowered into the final position of assembly)

In FIG. 4 the vertical line passing through the torque motor 4, reduction gear box 7, and the case 40 referred to as the center of rotation for the wheel 21 also represents the division of the apparatus into two sections: (i) cabin section 13 & 14, and (ii) hot section 15 & 16.

Figure 5:
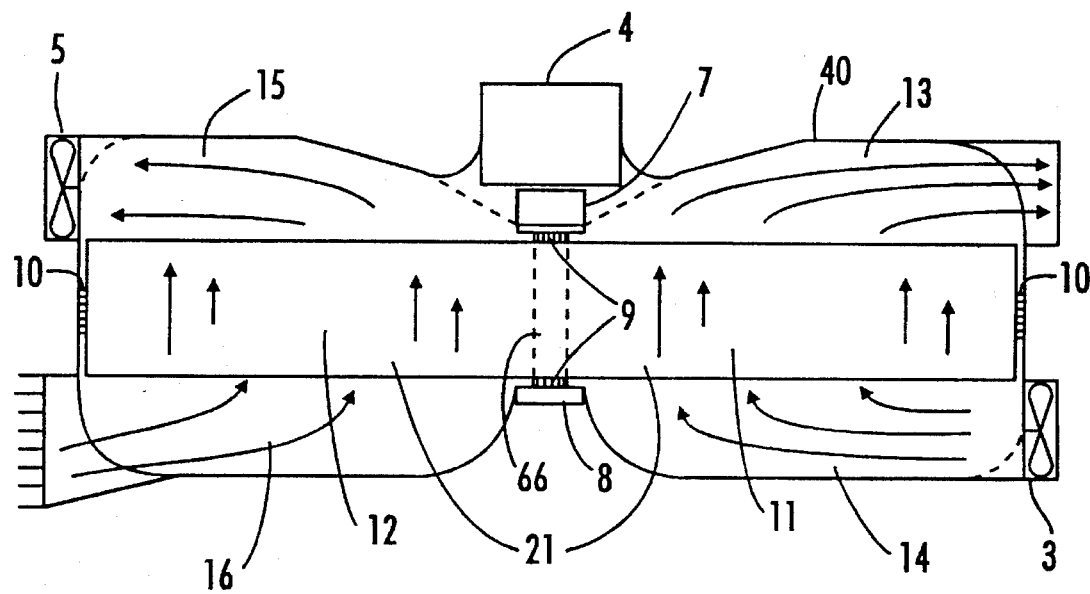
FIG. 5 is an enlarged schematic of the apparatus case and components shown in FIG. 4.
Figure 6:
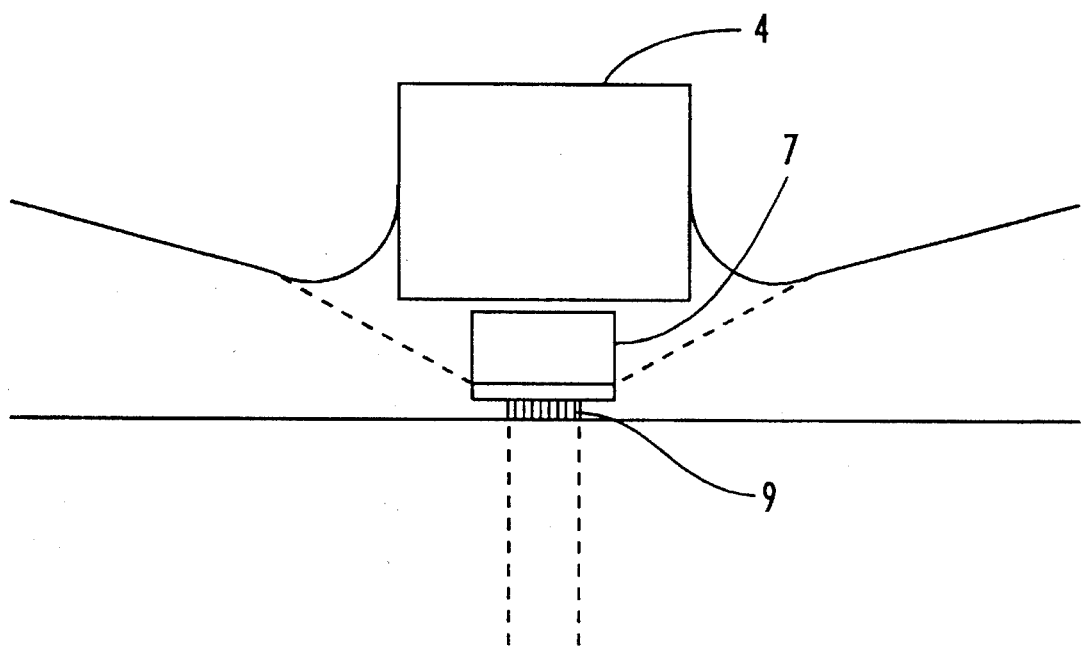
FIG. 6 is a detailed side view of the torque drive system and the seal component dividing the cabin and hot chamber shown in FIG. 5.
Figure 7:
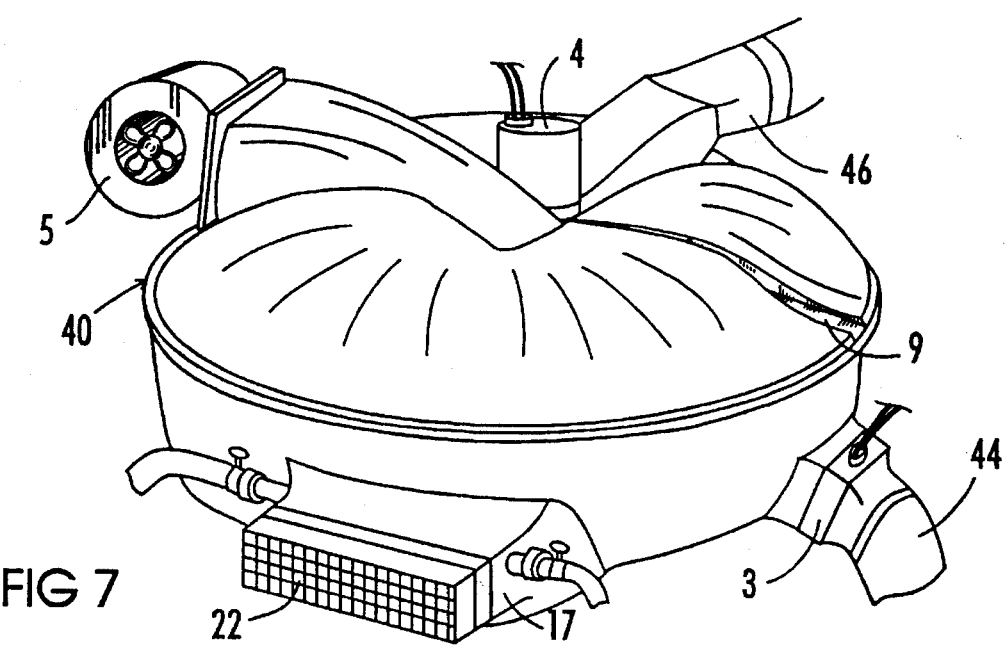
FIG. 7 is a perspective view of the apparatus of FIG. 4.

In FIG. 5 (with arrows indicating air flow), (i) the cabin section 13 & 14 has the cabin fan 3 forcing air from the vehicle cabin to form a positive pressure in the lower cabin chamber 14, the air flow is directed toward the cabin side 11 of the desiccant wheel 21, a brush seal 9 attached to the lower case 40 prevents the air from crossing over to the hot section 16. In FIG. 8A the lower seal 9 is shown in another view dividing the case into two sections where the seal 9 starts from a point outside of the edge of the lower bearing 150 running to the edge of the case 40 and up the side wall to meet seal 10 in both directions and forms a seal between the desiccant wheel 21 and the cabin chamber 14. The seals 9 are attached to the top of a diagonal ridge in the lower case which is raised to form one of the side of the lower cabin chamber 14. The other side other lower cabin chamber 14 is formed by half of the raised circumference wall of the case 40. The semicircular pocket of the lower cabin chamber provides for an even distribution of air to the cabin side of the desiccant wheel 11 as it rotates through the chamber. The top cabin chamber 13 is formed in a similar manner as the lower chamber 14. The seals 9 for the top cabin chamber 13 are attached in a similar manner as the lower chamber 14. The top cabin chamber 13 collects the dehumidified cabin air and directs this air to the air duct 46 which will contain the air flow to cabin vent 25. The seals 9 shown in FIG. 8B, Detail S1, consist of brushes that form a seal between the upper case and the desiccant wheel to prevent the crossover of air from one section to another and allows the wheel 21 to rotate freely. Seals shown in FIG. 8B, Detail S1 of the hot section are also used in the cabin chambers 13 & 14 in a similar configuration (not shown) in FIG. 5.

In FIG. 8B, (ii) the hot section consist of the following components: the air filter 22 is used to prevent dust and dirt from entering the system as the air enters from atmosphere, the air then enters the heat exchanger 17 where it is heated, the hot air is pulled into the lower hot chamber 16 formed in a similar manner as the cabin camber 14, The hot chambers 15 & 16 are sealed in a similar manner as the cabin chambers 13 & 14, FIG. 8B and Detail S1 & S2 show additional detail of the seals S1 & S2 used in both the cabin chambers and the hot chambers of the case 40 to prevent the crossover of air form one section to another, seal type S2 is used in location 9 and 10, the lower hot chamber 16 contains the hot air and provides an even distribution of hot air into the bottom of the hot section 12 of the desiccant wheel 21, the hot air is pulled into the desiccant wheel 12 to regenerate the desiccant material by evaporating off the moisture which was adsorbed during its previous cycle through the cabin chamber of the apparatus, the moist hot air exits the wheel into the upper hot chamber 15, then the hot fan 5 pulls the hot moist air out of hot chamber 15 and ejects it out into the atmosphere.

The two sections are sealed to prevent air crossover and also to prevent the air from flowing around the sides of the desiccant wheel 21. The seals consist of two types: the first type, seals 9 & 10, shown in FIGS. 5, 8 A, 8B and 8B, Detail S2, a web fabric 55 with a dense mass of short bristles 56 extending away from the webbing to touch the surface of the rotating desiccant wheel 21, with reference to FIG. 5 seal 10 of the S2 type is used to prevent the air from bypassing the wheel; the second type of seal S1, shown in FIGS. 8A, 8B, and FIGS. 8B, Detail S1, has a seal element 200 with a raised annular fin 202, Seal S1 provides sealing engagement between the bottom of the wheel 21 and the case around the outer perimeter of the wheel 21.

In FIG. 8A, seal S1 is also used in the upper and lower case 40 around the center of the wheel 21, to provide the seal around the bearing 150 (lower) and drive shaft 66 (upper) and to complete the seal in the open area between the left seals 9 and the right seal 9 for a complete air separation of the hot and cabin sections of case 40.

With reference to FIGS. 11–12, the invention is shown in use with a helicopter designated generally by the reference numeral 100 having a turbine engine 101 drawn in block diagram form on FIG. 12. Moist cabin air flow 102 is drawn from the interior of cabin 103 of helicopter 100. Dehumidified air 104 is reintroduced into the cabin. The system includes a desiccant wheel 106, a cabin air fan 107, compressor bleed air from the turbine engine 108 (to provide hot air to recharge the desiccant material on the wheel 106), an automatic electronic control device (not shown), and hot moist air exhaust 110 ejected from the aircraft.

With reference to FIGS. 12–13, the cabin air fan 107 pulls moist air into the system from the cabin, the air travels by air duct to the moist cabin chamber 124, the air is forced through the top half of the desiccant wheel 106, as the air passes through the wheel moisture is adsorbed out of the air, the dry air is forced into the dry cabin chamber 120, the dry air travels through an air duct to the air vent 104 where the dry air is directed toward the windshield to remove and/or prevent condensation from forming on the inside of the windshields 103. The apparatus uses excess hot air from the compressor section of the turbine engine 101. The bleed air from the compressor is released by the engine when the bleed band opens and allows the high temperature compressed air to escape. When the engine controls determines that the compressor pressure is higher than desired, it opens the bleed band to help prevent compressor stall. The bleed air has been used in many aircraft as a source of heat for cabin heating since the hot air is excess and there is little chance of carbon monoxide gas entering the compressor. The apparatus is similar to the automotive application with a few exceptions. Since the compressor is delivering high pressure hot air to the apparatus, there is no need for the invention to have a hot section fan or heat exchanger. The hot bleed air recharges the desiccant material on wheel 106 as the wheel rotates into the hot section 122 & 126 by evaporating off the moisture adsorbed in the desiccant when that portion of the wheel was in the cabin section 120 & 124. Torque motor 130 rotates the wheel 106 slowly form the cabin chambers 124 & 120 to adsorb cabin moisture to the hot chambers 110 & 122 where the moisture is evaporated. The automatic electronic control device box and sensors (not shown) would operate in a similar way as the automotive application with few exceptions. The control device would not need to operate a hot fan or a hot water valve (since they are not used in the aircraft application) but one of these outputs would control a valve to regulate the flow of bleed air to the apparatus. The electronic control device would also provide electrical current through the electrical connection 132 to the torque motor 130, and the cabin air fan 107 when the apparatus is activated to perform dehumidification. The system would continuously monitor the sensors to determine if the relative humidity has reached a point where dehumidification in the cabin is necessary. The automatic electronic control device (not shown) would turn on and turn off the system automatically. In FIG. 11, the apparatus us shown forward and below the windshield, the alternative location for the apparatus would be between the cabin floor and the outer skin of the aircraft with an extended air duct 104 to deliver the dehumidified air to the windshield.

The foregoing description describes the inventive apparatus and system used in an automobile embodiment and thus is provided by way of illustration and is not intended to be limiting as the inventive apparatus and system are equally useful with other types of motorized vehicles. Accordingly, various modifications may be made without departing from the scope and spirit of the invention.

What is claimed is:

1. An apparatus for defrosting and defogging the interior portion of a windshield with an impinging air stream, where the windshield surface to be defrosted or defogged is contained within the cabin compartment of a motorized vehicle capable of producing heat during operation, the apparatus comprising:

a desiccant wheel for dehumidification of the impinging air stream, wherein the wheel has a desiccant substance applied to its surface or integral to the substance used to form the wheel;

drive means for rotating the desiccant wheel;

heat exchanger for extracting heat from the motorized vehicle;

a case having an interior to house the desiccant wheel, wherein the case has a hot chamber and a cabin chamber;

first fan means for drawing air from a cabin compartment of a motorized vehicle and directing the drawn air to the interior of the cabin chamber of the case and back to the cabin of the motorized vehicle;

second fan means for directing an air stream to the heat exchanger and the hot chamber;

baffle air valve for directing dehumidified air through an alternate duct directly to the air-conditioning intake coils;

wherein the desiccant wheel rotates in response to the drive means within the hot and cabin chamber of the case to enable the desiccant wheel in combination with the desiccant substance applied hereto to collect moisture from the air delivered to the cabin chamber by the first fan means and allows the second fan means to evaporate the moisture collected by the desiccant wheel; and exhaust means for expelling air from the hot chamber of the case.

2. The apparatus of claim 1 wherein the first fan means further comprises: a fan for directing the dehumidified air within the case back into the cabin compartment of the motorized vehicle.

3. The apparatus of claim 1, wherein:

the second fan means is configured to pull air from atmosphere through the hot air filter, the heat exchanger, desiccant wheel, and expelled by the fan.

4. The system of claim 1 wherein:

the heat exchanger is configured to extract heat from the engine of the motorized vehicle, the exhaust manifold duct is configured to extract heat from the engine of the motorized vehicle, the exhaust pipe duct is configured to extract heat from the engine of the motorized vehicle, and the bleed band duct is configured to extract heat from the turbine engine of the motorized vehicle.

* * * * *